United States Patent
Mantell et al.

(10) Patent No.: US 10,421,266 B2
(45) Date of Patent: Sep. 24, 2019

(54) METHOD OF OPERATING EXTRUDER HEADS IN THREE-DIMENSIONAL OBJECT PRINTERS

(71) Applicant: Xerox Corporation, Norwalk, CT (US)

(72) Inventors: David A. Mantell, Rochester, NY (US); Peter J. Nystrom, Webster, NY (US); Christopher G. Lynn, Wolcott, NY (US)

(73) Assignee: Xerox Corporation, Norwalk, CT (US)

( * ) Notice: Subject to any disclaimer, the term of this patent is extended or adjusted under 35 U.S.C. 154(b) by 225 days.

(21) Appl. No.: 15/334,779

(22) Filed: Oct. 26, 2016

(65) Prior Publication Data

US 2018/0111336 A1    Apr. 26, 2018

(51) Int. Cl.
| | |
|---|---|
| *B33Y 30/00* | (2015.01) |
| *B29C 48/87* | (2019.01) |
| *B29C 48/25* | (2019.01) |
| *B29C 48/80* | (2019.01) |
| *B29C 64/106* | (2017.01) |
| *B29C 48/92* | (2019.01) |
| *B29C 64/209* | (2017.01) |
| *B29C 64/295* | (2017.01) |
| *B33Y 10/00* | (2015.01) |
| *B29K 101/12* | (2006.01) |
| *B29C 64/386* | (2017.01) |

(52) U.S. Cl.
CPC ............ *B33Y 30/00* (2014.12); *B29C 48/252* (2019.02); *B29C 48/802* (2019.02); *B29C 48/87* (2019.02); *B29C 48/92* (2019.02); *B29C 64/106* (2017.08); *B29C 64/209* (2017.08); *B29C 64/295* (2017.08); *B29C 64/386* (2017.08); *B29C 2948/92209* (2019.02); *B29C 2948/92409* (2019.02); *B29C 2948/92704* (2019.02); *B29C 2948/92904* (2019.02); *B29K 2101/12* (2013.01); *B33Y 10/00* (2014.12)

(58) Field of Classification Search
CPC ....... B33Y 30/00; B33Y 10/00; B29C 64/386; B29C 64/106; B29C 47/0801; B29C 47/802; B29C 47/864; B29C 47/92; B29C 2947/92209; B29C 2947/92409; B29C 2947/92704; B29C 2947/92904; B29K 2101/12

See application file for complete search history.

*Primary Examiner* — Robert S Walters, Jr.
(74) *Attorney, Agent, or Firm* — Maginot Moore & Beck LLP

(57) ABSTRACT

An apparatus changes the temperature of thermoplastic material in an extruder head to reduce the time for producing an object. The apparatus includes a cooling device located near the one or more nozzles of the extruder head to change the temperature of the thermoplastic material extruded by the extruder head. The apparatus cools the thermoplastic material to enhance the formation of exterior object features. A heater can also be positioned near the nozzle zone to heat the thermoplastic material to reduce the time for raising the viscosity of the thermoplastic material for forming interior regions of the object.

11 Claims, 3 Drawing Sheets

METHOD OF OPERATING EXTRUDER HEADS IN THREE-DIMENSIONAL OBJECT PRINTERS

TECHNICAL FIELD

This disclosure is directed to extruders used in three-dimensional object printers and, more particularly, to the operation of the extruders in three-dimensional object printers to optimize formation of objects.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use extruder heads that soften or melt extrusion material, such as ABS plastic, into thermoplastic material and then extrude the thermoplastic material in a predetermined pattern. The printer typically operates the extruder head to form successive layers of the thermoplastic material that form a three-dimensional printed object with a variety of shapes and structures. After each layer of the three-dimensional printed object is formed, the thermoplastic material cools and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

These additive manufacturing devices can produce highly functional three-dimensional (3D) parts, but typically the time of manufacture can be quite lengthy. One parameter that affects the time for object manufacture is the viscosity of the thermoplastic material extruded from the extruder head or heads. Lowering the viscosity of the thermoplastic material by increasing the extruder temperature can reduce time for the production process, but lowered viscosity can have a detrimental effect on the ability of the extruder to form detailed features in the part. One problem with changing the temperature of the extruded thermoplastic material arises because thermoplastic material continues to exude from the extruder while the temperature of the extruder is changed. This thermoplastic material that has a viscosity in a transition range to the next desired viscosity can produce defects in the object being formed. What is needed is a three-dimensional object printer that enables control of the viscosity of the thermoplastic material being extruded into a part.

SUMMARY

A new additive manufacturing system includes a controller configured to enable extrusion of thermoplastic material selectively at different viscosities for object formation. The additive manufacturing system includes an extruder head having a manifold configured to store thermoplastic material and at least one nozzle through which thermoplastic material from the manifold can be extruded, a mechanical mover configured to move extrusion material from a supply of extrusion material along a path, a heater having a heating element and a channel positioned along the path of the extrusion material to receive the extrusion material, the heater being configured to melt the extrusion material in the channel to form thermoplastic material and direct the thermoplastic material into the manifold of the extruder head, and a cooling device positioned near the at least one nozzle to cool the thermoplastic material in the at least one nozzle to a temperature different than a temperature of the thermoplastic material in the manifold of the extruder head.

A method of operating an additive manufacturing system enables extrusion of thermoplastic material selectively at different viscosities for object formation. The method includes detecting a transition from forming a first portion of an object to a second portion of the object, the first portion of the object being formed with a thermoplastic material having a first viscosity extruded from an extruder head and the second portion of the object being formed with a thermoplastic material having a second viscosity extruded from the extruder head, the first viscosity being different than the second viscosity, and changing a temperature of the thermoplastic material in a nozzle region of the extruder head from a first temperature to a second temperature to change the viscosity of the thermoplastic material from the first viscosity to the second viscosity.

BRIEF DESCRIPTION OF THE DRAWINGS

The foregoing aspects and other features of selectively extruding thermoplastic material at different viscosities are explained in the following description, taken in connection with the accompanying drawings.

DETAILED DESCRIPTION

Figure 1:
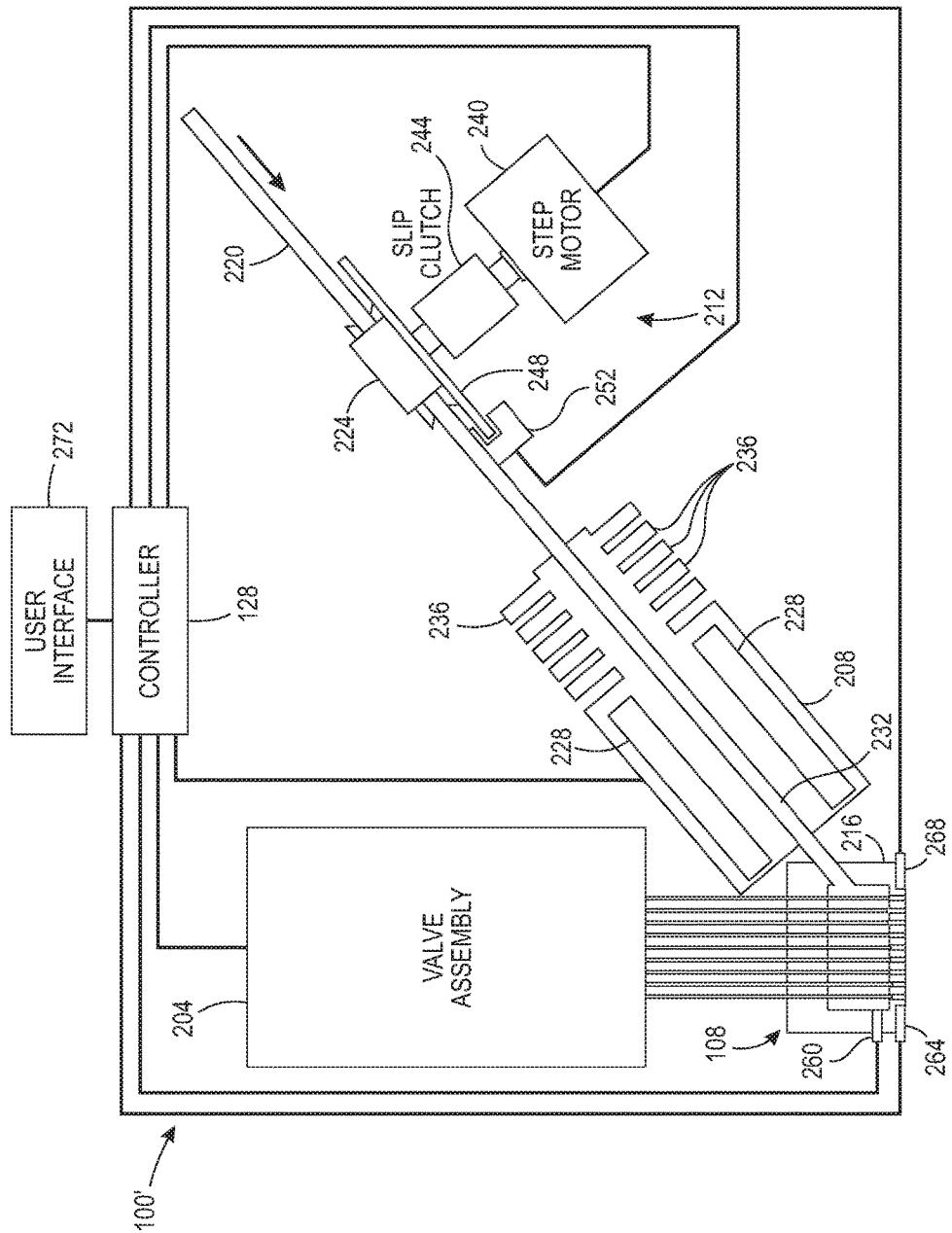
FIG. 1 depicts an additive manufacturing system that selectively extrudes thermoplastic material at different viscosities to form a three-dimensional object.

For a general understanding of the environment for the device disclosed herein as well as the details for the device, reference is made to the drawings. In the drawings, like reference numerals designate like elements.

As used herein, the term "extrusion material" refers to a material that is softened or melted to form thermoplastic material to be emitted by an extruder head in an additive manufacturing system. The extrusion materials include, but are not strictly limited to, both "build materials" that form permanent portions of the three-dimensional printed object and "support materials" that form temporary structures to support portions of the build material during a printing process and are then optionally removed after completion of the printing process. Examples of build materials include, but are not limited to, acrylonitrile butadiene styrene (ABS) plastic, polylactic acid (PLA), aliphatic or semi-aromatic polyamides (Nylon), plastics that include suspended carbon fiber or other aggregate materials, electrically conductive polymers, and any other form of material that can be thermally treated to produce thermoplastic material suitable for emission through an extruder head. Examples of support materials include, but are not limited to, high-impact polystyrene (HIPS), polyvinyl alcohol (PVA), and other materials capable of extrusion after being thermally treated. In some extrusion printers, the extrusion material is supplied as a continuous elongated strand of material commonly known as a "filament." This filament is provided in a solid form by one or more rollers pulling the extrusion material filament from a spool or other supply and feeding the filament into a heater that is fluidly connected to a manifold within the extruder head. The heater softens or melts the extrusion material filament to form a thermoplastic material that flows into the manifold. When a valve positioned between a nozzle and the manifold is opened, a portion of the thermoplastic material flows from the manifold through the nozzle and is emitted as a stream of thermoplastic material. As used herein, the term "melt" as applied to extrusion material refers to any elevation of temperature for the extrusion material that softens or changes the phase of the extrusion material to enable extrusion of the thermoplastic material through one or more nozzles in a printhead during operation of a three-dimensional object printer. The melted extrusion material is also denoted as "thermoplastic material" in this document. As those of skill in the art recognize, certain amorphous extrusion materials do not transition to a pure liquid state during operation of the printer.

As used herein, the term "manifold" refers to a cavity formed within a housing of an extruder head that holds a supply of thermoplastic material for delivery to one or more nozzles in the printhead during a three-dimensional object printing operation. As used herein, the term "extruder head" refers to a component of a printer that extrudes melted extrusion material received from a manifold through one or more nozzles. Some extruder heads include a valve assembly that can be electronically operated to enable thermoplastic material to flow through nozzles selectively. The valve assembly enables the independent connecting of one or more nozzles to the manifold to extrude the thermoplastic material. As used herein, the term "nozzle" refers to an orifice in an extruder head that is fluidly connected to the manifold in an extruder head and through which thermoplastic material is emitted toward an image receiving surface. During operation, the nozzle extrudes a substantially continuous linear arrangement of the thermoplastic material along the process path of the extruder head. A controller operates the valves in the valve assembly to control a rate at which each nozzle connected to the valve assembly extrudes thermoplastic material. The diameter of the nozzle affects the width of the line of extruded thermoplastic material. Different extruder head embodiments include nozzles having a range of orifice sizes with wider orifices producing lines having widths that are greater than the widths of lines produced by narrower orifices.

As used herein, the term "arrangement of extrusion material" refers to any pattern of thermoplastic material that the extruder head forms on an image receiving surface during a three-dimensional object printing operation. Common arrangements of thermoplastic material include straight-line linear arrangements of the thermoplastic material and curved arrangements of the thermoplastic material. In some configurations, the extruder head extrudes the thermoplastic material in a continuous manner to form the arrangement with a contiguous mass of the thermoplastic material while in other configurations the extruder head operates in an intermittent manner to form smaller groups of thermoplastic material that are arranged along a linear or curved path. The three-dimensional object printer forms various structures using combinations of different arrangements of thermoplastic material. Additionally, a controller in the three-dimensional object printer uses object image data and extruder head path data that correspond to different arrangements of thermoplastic material to operate the extruder head and form each arrangement of the extrusion material. As described below, the controller optionally adjusts the operation of the valve assembly to form multiple arrangements of thermoplastic material through one or more nozzles during a three-dimensional printing operation.

As used herein, the term "process direction" refers to a direction of relative movement between an extruder head and an image receiving surface that receives thermoplastic material extruded from one or more nozzles in the head. The image receiving surface is either a support member that holds a three-dimensional printed object or a surface of the partially formed three-dimensional object during an additive manufacturing process. In the illustrative embodiments described herein, one or more actuators move the extruder head about the support member, but alternative system embodiments move the support member to produce the relative motion in the process direction while the extruder head remains stationary.

As used herein, the term "cross process direction" refers to an axis that is perpendicular to the process direction in the plane of the process direction. The process direction and cross-process direction refer to the relative path of movement of the extruder head and the surface that receives the thermoplastic material. In some configurations, the extruder head includes an array of nozzles that extend along the cross-process direction. Adjacent nozzles within the extruder head are separated by a predetermined distance in the cross-process direction. In some configurations, the system rotates the extruder head to adjust the effective cross-process direction distance between adjacent nozzles in the extruder head to adjust the corresponding cross-process direction distance between arrangements of the thermoplastic material extruded from the nozzles in the extruder head.

During operation of the additive manufacturing system, an extruder head moves in the process direction along both straight and curved paths relative to a surface that receives thermoplastic material during the three-dimensional object printing process. Additionally, an actuator in the system optionally rotates the extruder head about an axis perpendicular to the surface of the object called the Z axis to adjust the effective cross-process distance that separates nozzles in the extruder head to enable the extruder head to form two or more arrangements of thermoplastic material with predetermined distances between each arrangement of the thermoplastic material. The extruder head moves both along the outer perimeter to form outer walls of a region in a layer of the printed object and within the perimeter to fill all or a portion of the region with the thermoplastic material. The extruder head forming the arrangements can move through any planar or rotational degree of freedom provided the processing of the image data for the three-dimensional object is adequate to generate the data for operating the extruder head.

Figure 3:
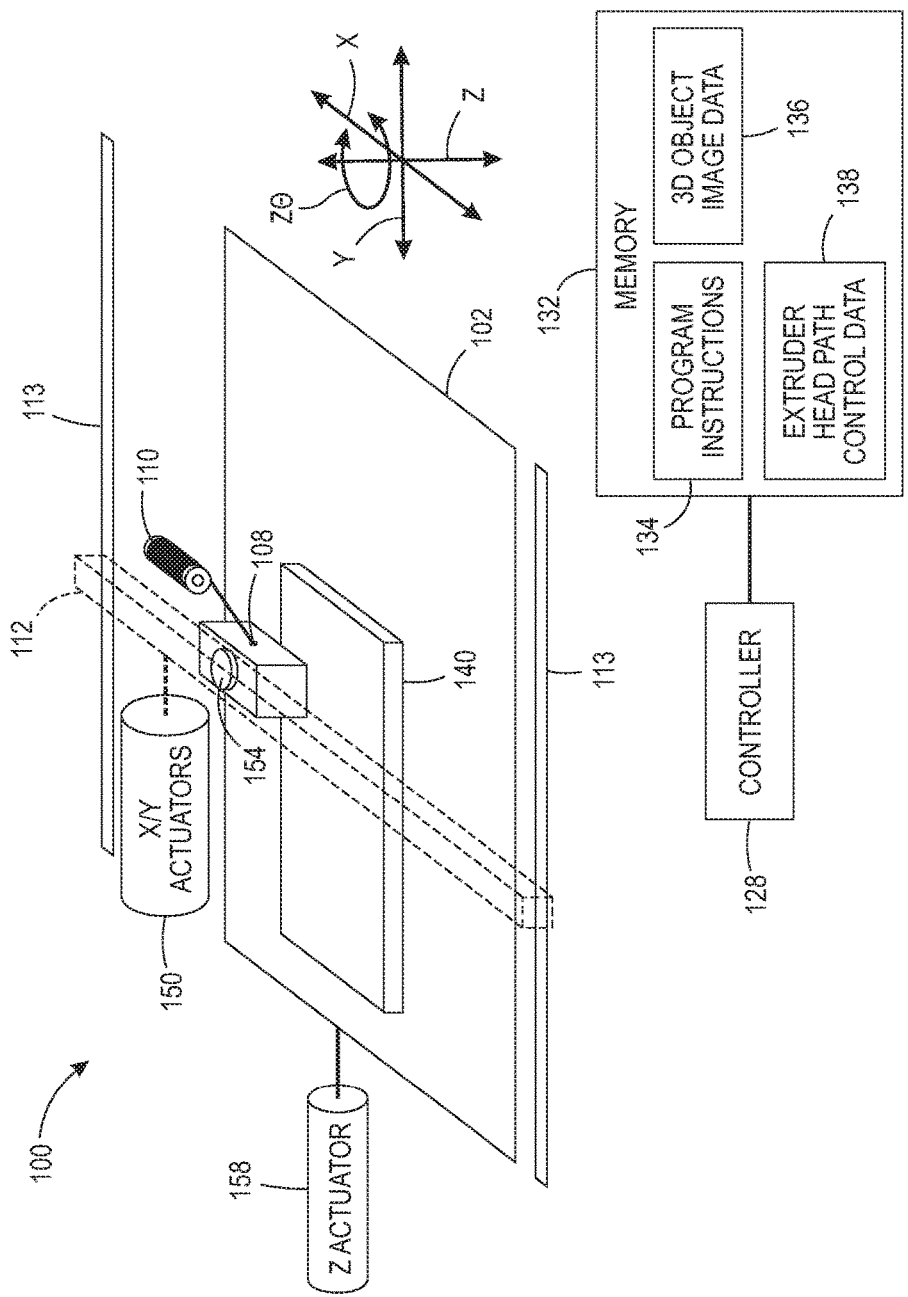
FIG. 3 is a diagram of a prior art three-dimensional object printer having a multi-nozzle extrusion printhead that does not have the solid extrusion material feeding system of FIG. 1.

FIG. 3 depicts a prior art three-dimensional object additive manufacturing system or printer 100 that is configured to operate an extruder head 108 to form a three-dimensional printed object 140. Although the printer 100 is depicted as a printer that uses planar motion to form an object, other printer architectures can be used with the extruder head and mechanical mover of extrusion material described in this document. These architectures include delta-bots, selective compliance assembly robot arms (SCARAs), multi-axis printers, non-Cartesian printers, and the like. The printer 100 includes a support member 102, a multi-nozzle extruder head 108, extruder head support arm 112, controller 128, memory 132, X/Y actuators 150, an optional Zθ actuator 154, and a Z actuator 158. In the printer 100, the X/Y actuators 150 move the extruder head 108 to different locations in a two-dimensional plane (the "X-Y plane") along the X and Y axes to extrude arrangements of thermoplastic material that form one layer in a three-dimensional printed object, such as the object 140 that is depicted in FIG. 3. For example, in FIG. 3 the X/Y actuators 150 translate the support arm 112 and extruder head 108 along guide rails 113 to move along the Y axis while the X/Y actuators 150 translate the extruder head 108 along the length of the support arm 112 to move the printhead along the X axis. The extruded patterns include both outlines of one or more regions in the layer and swaths of the thermoplastic material that fill in the regions within the outline of thermoplastic material patterns. The Z actuator 158 controls the distance between the extruder head 108 and the support member 102 along the Z axis to ensure that the nozzles in the extruder head 108 remain at a suitable height to extrude thermoplastic material onto the object 140 as the object is formed during the printing process. The Zθ actuator 154 controls an angle of rotation of the extruder head 108 about the Z axis (referenced as Zθ in FIG. 3) for some embodiments of the extruder head 108 that rotate about the Z axis. This movement controls the separation between nozzles in the extruder head 108, although some extruder heads do not require rotation during the manufacturing process. In the system 100, the X/Y actuators 150, Zθ actuator 154, and the Z actuator 158 are embodied as electromechanical actuators, such as electric motors, stepper motors, or any other suitable electromechanical device. In the illustrative embodiment of FIG. 3, the three-dimensional object printer 100 is depicted during formation of a three-dimensional printed object 140 that is formed from a plurality of layers of thermoplastic material.

The support member 102 is a planar member, such as a glass plate, polymer plate, or foam surface, which supports the three-dimensional printed object 140 during the manufacturing process. In the embodiment of FIG. 3, the Z actuator 158 also moves the support member 102 in the direction Z away from the extruder head 108 after application of each layer of thermoplastic material to ensure that the extruder head 108 maintains a predetermined distance from the upper surface of the object 140. The extruder head 108 includes a plurality of nozzles and each nozzle extrudes thermoplastic material onto the surface of the support member 102 or a surface of a partially formed object, such the object 140. In the example of FIG. 3, extrusion material is provided as a filament from extrusion material supply 110, which is a spool of ABS plastic or another suitable extrusion material filament that unwraps from the spool to supply extrusion material to the extruder head 108.

The support arm 112 includes a support member and one or more actuators that move the extruder head 108 during printing operations. In the system 100, one or more actuators 150 move the support arm 112 and extruder head 108 along the X and Y axes during the printing operation. For example, one of the actuators 150 moves the support arm 112 and the extruder head 108 along the Y axis while another actuator moves the extruder head 108 along the length of the support arm 112 to move along the X axis. In the system 100, the X/Y actuators 150 optionally move the extruder head 108 along both the X and Y axes simultaneously along either straight or curved paths. The controller 128 controls the movements of the extruder head 108 in both linear and curved paths that enable the nozzles in the extruder head 108 to extrude thermoplastic material to the support member 102 or onto previously formed layers of the object 140. The controller 128 optionally moves the extruder head 108 in a rasterized motion along the X axis or Y axis, but the X/Y actuators 150 can also move the extruder head 108 along arbitrary linear or curved paths in the X-Y plane.

The controller 128 is a digital logic device such as a microprocessor, microcontroller, field programmable gate array (FPGA), application specific integrated circuit (ASIC) or any other digital logic that is configured to operate the printer 100. In the printer 100, the controller 128 is operatively connected to one or more actuators that control the movement of the support member 102 and the support arm 112. The controller 128 is also operatively connected to a memory 132. In the embodiment of the printer 100, the memory 132 includes volatile data storage devices, such as random access memory (RAM) devices, and non-volatile data storage devices such as solid-state data storage devices, magnetic disks, optical disks, or any other suitable data storage devices. The memory 132 stores programmed instruction data 134 and three-dimensional (3D) object image data 136. The controller 128 executes the stored program instructions 134 to operate the components in the printer 100 to form the three-dimensional printed object 140 and print two-dimensional images on one or more surfaces of the object 140. The 3D object image data 136 includes, for example, a plurality of two-dimensional image data patterns that correspond to each layer of thermoplastic material that the printer 100 forms during the three-dimensional object printing process. The extruder head path control data 138 include a set of geometric data or actuator control commands that the controller 128 processes to control the path of movement of the extruder head 108 using the X/Y actuators 150 and to control the orientation of the extruder head 108 using the Zθ actuator 154. The controller 128 operates the actuators to move the extruder head 108 or the support member 102 while the extruder head extrudes thermoplastic material to form objects.

FIG. 1 depicts an additive manufacturing system 100' that includes a valve assembly 204 in the extruder head 108 that is operatively connected to the controller 128 to enable control of the operation of the valves and the material emitted from the plurality nozzles in the extruder head 108. Specifically, the controller 128 activates and deactivates different valves in the valve assembly 204 connected to the nozzles in the extruder head 108 to extrude thermoplastic material and form arrangements of the thermoplastic material in each layer of the three-dimensional printed object 140. System 100' also includes an extrusion material dispensing system 212 that feeds filament from the supply 110 to the heater 208 at a rate that maintains the pressure of the thermoplastic material in the manifold 216 within a predetermined range during operation of the system 100'. The dispensing system 212 is one embodiment that is suitable for regulating pressure of the thermoplastic material in the manifold. Additionally, the controller 128 is operatively connected to an actuator in the dispensing system 212 to control the rate at which the dispensing system 212 delivers solid filament to a heater 208. The heater 208 melts extrusion material filament 220 fed to the heater 208 via drive roller 224. Actuator 240 drives the roller 224 and is operatively connected to the controller 128 so the controller can regulate the speed at which the actuator drives the roller 224. Another roller opposite roller 224 is free-wheeling so it follows the rate of rotation at which roller 224 is driven. While FIG. 1 depicts a feed system that uses an electromechanical actuator and the driver roller 224 as a mechanical mover to move the filament 220 into the heater 208, alternative embodiments use one or more actuators to operate a mechanical mover in the form of a rotating auger or screw. The auger or screw moves solid phase extrusion material in the form of extrusion material powder or pellets into the heater 208.

In the embodiment of FIG. 1, the heater 208 has a body that is formed from stainless steel and in which one or more heating elements 228, such as electrically resistive heating elements, are positioned about a channel 232. The heating elements 228 are operatively connected to the controller 128 so the controller 128 can connect the heating elements 228 to electrical current selectively to melt the filament of extrusion material 220 in channel 232 within the heater 208. While FIG. 1 shows heater 208 receiving extrusion material in a solid phase as solid filament 220, in alternative embodiments, it receives the extrusion material in solid phase as powdered or pelletized extrusion material. Cooling fins 236 attenuate heat in the channel 232 upstream from the heater 208. A portion of the extrusion material that remains solid in the channel 232 at or near the cooling fins 236 forms a seal in the channel 232 that prevents thermoplastic material from exiting the heater from any other opening than the connection to the manifold 216. The extruder head 108 can also include additional heating elements to maintain an elevated temperature for the thermoplastic material within the manifold 216. In some embodiments, a thermal insulator covers portions of the exterior of the extruder head 108 to maintain a temperature within the manifold 216.

To maintain a fluid pressure of the thermoplastic material within the manifold 216 within a predetermined range, avoid damage to the extrusion material, and control the extrusion rate through the nozzles, a slip clutch 244 is operatively connected to the drive shaft of the actuator 240. As used in this document, the term "slip clutch" refers to a device applies frictional force to an object to move the object up to a predetermined set point. When the range about the predetermined set point for the frictional force is exceeded, the device slips so it no longer applies the frictional force to the object. The slip clutch enables the force exerted on the filament 220 to remain constant no matter how many valves are opened or how fast the actuator 240 drives roller 224. This constant force can be maintained by either driving the actuator 240 at a speed that is higher than the fastest expected rotational speed of the filament drive roller 224 or by putting an encoder wheel 248 on the roller 224 and sensing the rate of rotation with a sensor 252.

The signal generated by the sensor 252 indicates the angular rotation of the roller 224 and the controller 128 receives this signal to identify the speed of the roller 224. The controller 128 is further configured to adjust the signal provided to the actuator 240 to control the speed of the actuator. When the controller is configured to control the speed of the actuator 240, the controller 128 operates the actuator 240 so its speed is slightly faster than the rotation of the roller 224. This operation ensures that the torque on the drive roller 224 is always a function of the slip clutch torque. If one valve/nozzle combination is open, the filament 220 moves slowly. If all of the actuator/valve combinations in the assembly 204 are opened, the filament begins to move more quickly and the controller 128 immediately operates the actuator 240 to increase its speed to ensure that the output shaft of the actuator is turning faster than the speed of the roller 224 indicated by the sensor 252. A delay inherently exists between the force applied to the filament and the pressure of the thermoplastic material in the nozzle region of the extruder header. Empirical data of these delays enable set points to be defined for the slip clutch that enable the slip clutch to be operated to provide more uniform pressure of the thermoplastic material in the nozzle region of the extruder head.

The system 100' also includes a temperature sensor 260, a cooling device 264, a heater 268, and a user interface 272 that includes an input device for receiving data from an operator. The heater 268 is operatively connected to the controller 128 to enable the controller to connect the heater 268 to electrical power selectively to operate the heater and heat the nozzle region of the extruder head 108. The cooling device 264 is also operatively connected to the controller 128 to enable the controller to connect the cooling device 268 to electrical power selectively to operate the cooling device and cool the nozzle region of the extruder head 108. In one embodiment, the cooling device 264 is a fan or a source of pressurized air from outside of the extruder head and the heater 268 is a resistive heater, but other known cooling devices and heaters can be used as well. In another alternative embodiment, the cooling device 264 and heater 268 can be implemented as a single Peltier device. While this embodiment does not require two different thermal devices for regulation of the extruder head 108 at the nozzle region, the Peltier device can be less efficient and more expensive than an embodiment having both a heater and a cooling device. The temperature sensor 260 generates a signal indicative of the temperature at the nozzle region. The controller 128 uses this signal to operate the heater 268 and the cooling device 264 to regulate the temperature of the thermoplastic material extruder from the head 108 as well as to control the opening and closing of the valves in the valve assembly 204.

Figure 2:
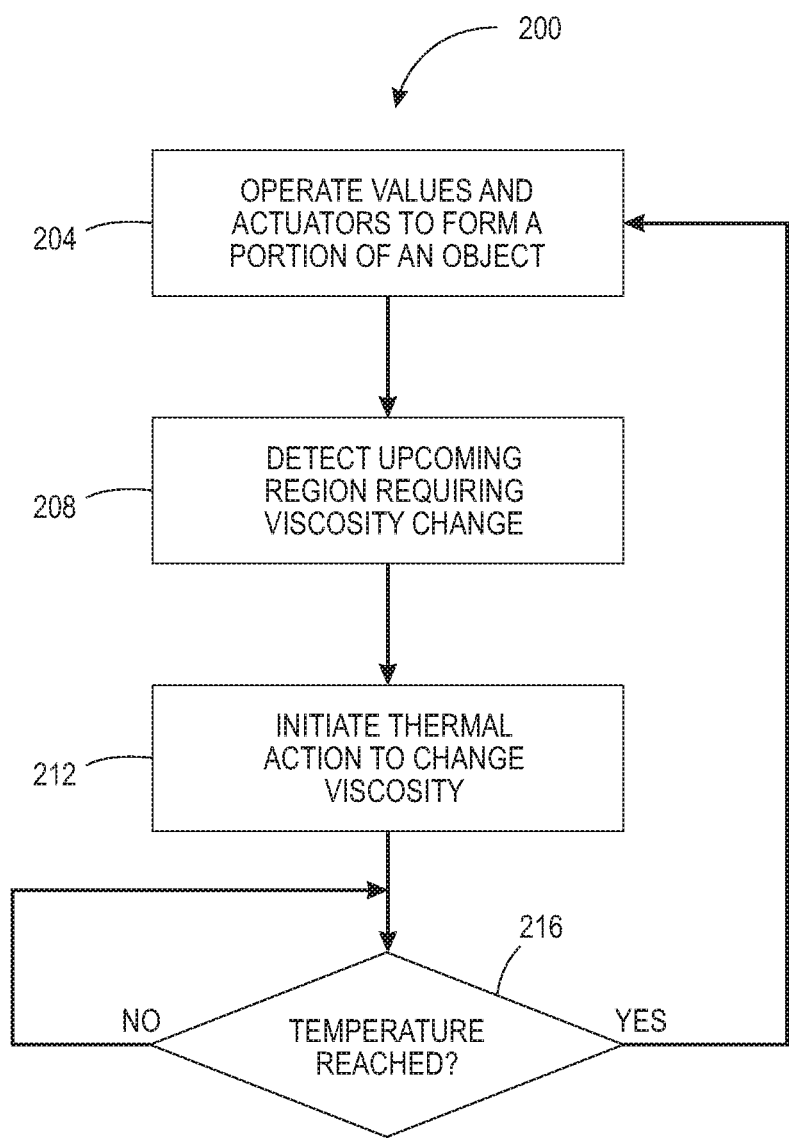
FIG. 2 is a flow diagram of a process for operating the additive manufacturing system of FIG. 1.

The process of operating an additive manufacturing system to produce an object has conflicting requirements at different portions of the object. These requirements frequently relate the relative speed between the extruder head and the support member and the temperature and viscosity of the thermoplastic material. These aspects affect the ability of the material to stay where it is placed, its adherence to previously formed object areas, and the rate at which the material solidifies. If the temperature of the material is too cool, the extruded material does not adhere to a previously formed layer. By slowing the relative speed of the extruder head and support member as the exterior of the object is formed, the thermoplastic material has time to cool. Additionally, this slower movement reduces forces arising from the moving extruder head that tend to pull the thermoplastic material away from the position where it was initially placed. The higher viscosity of the thermoplastic material that is conducive for printing features on the object exterior, however, is less than optimal for printing the interior regions of objects. In the interior areas, a lower viscosity helps fill openings, ensures contact between layers, and helps the layers form tighter bonds to one another. The process 200 of FIG. 2 balances these competing principles.

The description of process 200 is made with statements that the process is performing some task or function. These statements refer to a controller or general purpose processor executing programmed instructions stored in a memory operatively connected to the controller or processor to manipulate data or to operate one or more components in the printer to perform the task or function. The controller 128 noted above can be such a controller or processor. Alternatively, the controller 128 can be implemented with more than one processor and associated circuitry and components, each of which is configured to form one or more tasks or functions described herein. For example, the controller 128 can be a digital logic device such as a microprocessor, microcontroller, field programmable gate array (FPGA), application specific integrated circuit (ASIC) or any other digital logic that is configured to operate the printer 100. In the printer 100, the controller 128 is operatively connected to one or more actuators that control the movement of the support member 102 and the support arm 112. The controller 128 is also operatively connected to a memory 132. In the embodiment of the printer 100, the memory 132 includes volatile data storage devices, such as random access memory (RAM) devices, and non-volatile data storage devices such as solid-state data storage devices, magnetic disks, optical disks, or any other suitable data storage devices. The memory 132 stores programmed instruction data 134 and three-dimensional (3D) object image data 136. The controller 128 executes the stored program instructions 134 to operate the components in the printer 100 to form the three-dimensional printed object 140 and print two-dimensional images on one or more surfaces of the object 140. The 3D object image data 136 includes, for example, a plurality of two-dimensional image data patterns that correspond to each layer of thermoplastic material that the printer 100 forms during the three-dimensional object printing process. The extruder head path control data 138 include a set of geometric data or actuator control commands that the controller 128 processes to control the path of movement of the extruder head 108 using the X/Y actuators 150 and to control the orientation of the extruder head 108 using the Zθ actuator 154. These data can also include data for operating the sources of heated and cooled air to control the thermal conditions of the extruder head.

In the process 200, the controller 128 operates the valves in the valve assembly as the controller operates actuators to move the extruder head 108 or the support member 102 to form a portion of an object (block 204). The temperature of the thermoplastic material is in a range that makes the viscosity of the thermoplastic material appropriate for the portion of the object being formed. For example, if the portion of the object being formed is within the interior of the object where solid areas without features are formed, the temperature is higher so the viscosity is lower and the thermoplastic material can be extruded more quickly to form the solid areas. Alternatively, if the portion of the object being formed is close to or at the exterior of the object where structural features are formed, such as overhanging ledges or the like, the temperature is lower so the viscosity is higher and the thermoplastic material is extruded more slowly to form the features. As the process continues, the controller 128 analyzes upcoming regions to be formed to detect transition regions requiring viscosity changes. Once a transition region is detected (block 208), the controller 128 initiates the appropriate thermal action (block 212). If a transition is being made from an interior region to an exterior region, the temperature of the thermoplastic material is reduced so the controller 128 operates the cooling device 264 to cool the nozzle region and the thermoplastic material at the nozzle region. If a transition is being made from an exterior region to an interior region, the temperature of the thermoplastic material is increased so the controller 128 operates the heater 268 to heat the nozzle region and the thermoplastic material at the nozzle region. The controller 128 monitors the signal from the sensor 260 to detect when the temperature for the next region is reached (block 216). If necessary, the controller 128 slows or stops the movement of the extruder head 108 or the support member 102 while the temperature changed is achieved. Additionally, the controller 128 can close the nozzles of the extruder head for a predetermined period of time to enable the material in the extruder head to reach the next temperature. Once the temperature for the next region is reached, the controller 128 operates the valves in the valve assembly 204 and moves the extruder head 108 or the support member 102 appropriately to form the next region (block 204).

The process 200 enables the outside of an object or group of objects to be formed before the interior areas are produced. The exterior is formed with the thermoplastic material being heated to a temperature that is lower than the temperature to which the material is heated for interior area formation. Additionally, the relative speed between the extruder head and support member is lower during exterior area formation than it is during interior area formation. The process enables transitions between the formation of exterior and interior areas to occur frequently during the production of an object.

In some embodiments of the system 100' and the process 200, the temperature of the thermoplastic material for exterior part formation is approximately 235° C., though this temperature can vary by as much as 20° C. depending upon the source of the extrusion material. For interior area printing, this temperature is increased by as much as 50° C. to enable the thermoplastic to be extruded adequately at the higher speeds that can be used for interior area formation. The ability to transition the temperature of the thermoplastic material within this range is aided by directing the heating and cooling at the nozzles of the extruder head as described above. With the temperature control enabled by the nozzle region heating and cooling and the feedback control available with the temperature signal generated by the temperature sensor 260, the controller 128 can adjust the thermoplastic material temperature and viscosity over a range of temperatures useful for different types of features. For example, the controller 128 can operate the heater 268 and the cooling device 264 to form overhanging exterior features at a first thermoplastic viscosity, typical exterior features at a second thermoplastic viscosity, small interior features at a third thermoplastic viscosity, and large interior features at a fourth thermoplastic viscosity. Additionally, thermoplastic material temperature control can be regulated with regard to a quality level selected for the object being formed. The quality level is identified by data entered by a system operator in the input device of user interface 272. The controller 128 is further configured to regulate thermoplastic material temperatures in a range commensurate with the quality level data. For example, a temperature set point for a particular type of feature is regulated within a tighter range about the set point when a higher quality level is selected for the production of an object. Wider ranges about the set point are tolerated for lower quality levels. The controller 128 can also alter image quality parameters, such as layer thickness or overall thermoplastic material temperature, with reference to the selected quality level.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for operating a three-dimensional object printer comprising:
   detecting with a controller a transition from forming a first portion of an object to a second portion of the object, the first portion of the object being formed with a thermoplastic material having a first viscosity extruded from an extruder head and the second portion of the object to be formed with the thermoplastic material having a second viscosity extruded from the extruder head, the first viscosity being different than the second viscosity; and changing a temperature of the thermoplastic material to be extruded from the extruder head while the thermoplastic material is in a nozzle region of the extruder head from a first temperature to a second temperature to change the viscosity of the thermoplastic material being extruded from the extruder head from the first viscosity to the second viscosity to enable formation of the second portion of the object.

2. The method of claim 1, the changing of the temperature of the thermoplastic material further comprises:

operating a cooling device with the controller to cool the thermoplastic material.

3. The method of claim 2 further comprising:

generating a signal indicative of a temperature of the thermoplastic material in the extruder head with a sensor; and operating the cooling device with the controller to change the temperature of the thermoplastic material to be extruded from the extruder head with reference to the signal generated by the sensor.

4. The method of claim 3, the changing of the temperature of the thermoplastic material to be extruded from the extruder head further comprises:

operating a heater in the nozzle region of the extruder head with the controller to heat the thermoplastic material in the nozzle region of the extruder head.

5. The method of claim 4 wherein the operation of the heater and the cooling device is operation of a Peltier device.

6. The method of claim 3 wherein the operation of the cooling device is operation of an air moving source directed to the nozzle region of the extruder head.

7. The method of claim 2 further comprising:

operating the cooling device with the controller with reference to a position of a portion of the object being formed to change the temperature of the thermoplastic material to be extruded from the extruder head.

8. The method of claim 2 further comprising:

receiving with an input device data identifying a quality level for the object being formed; and operating the cooling device with the controller with reference to the data received by the input device.

9. The method of claim 8 further comprising:

operating the cooling device with the controller with reference to data stored in a memory that identifies the temperature for the thermoplastic material in the extruder head.

10. The method of claim 9 further comprising:

closing at least one nozzle in the nozzle region of the extruder head to enable the thermoplastic material in the extruder head to reach a temperature identified by the data stored in the memory.

11. The method of claim 9 further comprising:

stopping movement between the extruder head and an object being formed with the thermoplastic material extruded from the extruder head to enable the thermoplastic material in the extruder head to reach a temperature identified by the data stored in the memory.

* * * * *